United States Patent [19]

Gioiosa

[11] Patent Number: 4,672,448
[45] Date of Patent: Jun. 9, 1987

[54] PHASE ADJUSTMENT CIRCUIT FOR SCANNING VIDEO DISPLAY

[75] Inventor: Anthony V. Gioiosa, Justice, Ill.
[73] Assignee: Motorola, Inc., Schaumburg, Ill.
[21] Appl. No.: 794,220
[22] Filed: Oct. 31, 1985
[51] Int. Cl.$^4$ .............................................. H04N 5/04
[52] U.S. Cl. ..................................... 358/148; 358/158
[58] Field of Search ............... 358/148, 152, 153, 158, 358/159, 319; 375/111, 118, 119, 120

[56] References Cited

U.S. PATENT DOCUMENTS

| | | | |
|---|---|---|---|
| 4,490,741 | 12/1984 | Hornback | 358/152 |
| 4,567,552 | 1/1986 | Stroomer et al. | 358/158 |
| 4,591,910 | 5/1986 | Lai et al. | 358/148 |

OTHER PUBLICATIONS

Motorola VP39 Service Manual, Composite Video CRT Display Monitors 1981.

Primary Examiner—James J. Groody
Assistant Examiner—Michael D. Parker
Attorney, Agent, or Firm—Phillip H. Melamed

[57] ABSTRACT

Phase adjustment circuit for controlling horizontal scanning of a scanning video display is provided. Horizontal sync pulses are received having leading edges to be used for determining the occurrence of the horizontal retrace of a scanning electron beam. A manual phase adjustment control is provided by effectively comparing a controllable adjustable delayed leading edge, provided in response to the horizontal sync signal leading edge, with the trailing edge of a retrace pulse, having an effective width W, provided during the retrace cycle of the scanning electron beam. An adjustable monostable circuit delays the horizontal sync signal leading edge by a delay time D1, and this provides one input to a phase locked loop. Another input to the phase locked loop is provided by the trailing edge of the retrace pulse. By phase locking these two inputs, phase adjustment of the occurrence of the retrace pulse is possible so as to implement a phase adjustment $\phi$ equal to the adjustable delay D1 minus the retrace pulse width W. This permits providing a manually adjustable negative or positive phase delay for the occurrence of the retrace pulse with respect to the horizontal sync signal, and thus enables the present invention to accommodate various different video formats where video may commence either prior to, coincident with or after the occurrence of the horizontal sync signal leading edge.

20 Claims, 2 Drawing Figures

PHASE ADJUSTMENT CIRCUIT FOR SCANNING VIDEO DISPLAY

BACKGROUND OF THE INVENTION

The present invention is related to the field of phase adjustment circuits, and more particularly to the field of tracking phase adjustment circuits adaptable for use in scanning video displays. The present invention also relates to scanning video display circuits utilizing the improved phase adjustment circuit of the present invention.

Typically scanning video display circuits are required to receive a horizontal sync signal, consisting of periodic sync pulses, and control the horizontal sweep of a cathode ray tube (CRT) electron beam. The instantaneous horizontal position of the electron beam with respect to the CRT screen is determined by controlling the excitation current in a CRT horizontal deflection yoke. While horizontal deflection control circuits are operative in response to the receipt of the periodic horizontal sync pulses, the video signals to be displayed are separately routed to video driver circuits of the CRT. This operation is conventional in typical television and scanning video display monitors.

Many times, a particular customer will generate the video signal which is to be displayed such that it will commence either prior to, later than or coincident with the horizontal sync signal leading edge whose occurrence determines the subsequent occurrence of horizontal video retrace and trace cycles of the electron gun. Thus video display circuits should preferably be adjustable such that the retrace and trace cycles can have their time occurrences adjusted with respect to the occurrence of the horizontal sync signal leading edge. This allows adjustment for proper centering of the video on the CRT screen. One technique of accomplishing this signal adjustment is to utilize a phase locked loop (PLL) which is preceded by an adjustable delay circuit which receives the horizontal sync signal and provides a delay signal in response thereto as one input to the PLL. The output of the PLL is utilized to generate a resultant signal which generally corresponds to the flyback (retrace) pulse which occurs during and as a result of the resetting of the horizontal scan. The flyback pulse is coupled, typically without inversion, as the other input to the phase locked loop such that an adjustable delayed edge of the delay signal, corresponding to but delayed with respect to the sync signal leading edge, and the leading edge of the flyback pulse are phase compared.

The above system has been utilized to implement a predetermined amount of positive delay such that the flyback pulse leading edge (at the start of retrace) will occur in response to a sync signal leading edge at a predetermined adjustable time after the occurrence of the horizontal sync signal leading edge. In other words, a positive delay phase adjustment is provided for the occurrence of the retrace pulse of the scanning video display monitor with respect to the occurrence of the horizontal sync leading edge. When the term "leading edge" is utilized referring to the horizontal sync pulse, of course it is understood that this can either be a rising or falling edge of the horizontal sync pulse.

While systems such as the above described system function satisfactorily in some applications, they are not readily usable in situations where the video signal to be displayed occurs either coincident with the occurrence of the leading edge of a horizontal sync pulse or prior to the occurrence of the leading edge of the horizontal sync pulse. In those cases a negative phase relationship adjustment between the occurrence of the retrace pulse and the occurrence of the horizontal sync pulse leading edge may be required, and the previous circuit can only implement such a result if a substantially long delay period is utilized. However, when such a long delay period is utilized, stability and video jitter problems occur which are accentuated if very high horizontal scan rates are to be utilized. Thus the prior scanning video phase adjustment circuits utilized for the hortizontal drive circuitry could not satisfactorily accommodate situations where the formatting of the video signal resulted in the video occurring prior to or at the occurrence of the leading edge of the horizontal sync pulse. The end result was that either totally different phase adjustment circuits must be generated depending upon which type of video format is to be received, or the video format must be changed. Requiring separate adjustment circuits depending upon which type of video format is to be received requires having different monitor circuits for each type of video format to be received and this is not an economical solution. Advising the end customer that he must alter his video format to correspond to the format desired by the video monitor is also not a satisfactory solution.

SUMMARY OF THE INVENTION

An object of the present invention is to provide an improved phase adjustment circuit which is adaptable for use in a scanning video display and which overcomes the above mentioned deficiencies of prior phase adjustment circuits.

A more particular object of the present invention is to provide an improved phase adjustment circuit which is able to readily implement negative or positive phase adjustment of a desired resultant signal with respect to a received leading edge of a periodic sync signal.

Another object of the present invention is to provide an improved scanning video display circuit which utilizes a phase adjustment circuit so as to phase adjust the occurrence of a scanning retrace pulse such that either a positive or negative phase relationship can be provided between the leading edge of a horizontal sync pulse and the occurrence of the leading edge of a horizontal retrace pulse.

In one embodiment of the present invention an improved phase adjustment circuit is provided. The phase adjustment circuit comprises: means for receiving a sync signal comprising periodic pulses having leading edges; phase adjustment means for receiving said sync signal leading edges and providing in response thereto a resultant signal comprising periodic pulses having effective leading edges, said resultant signal leading edges comprising controllable phase adjusted leading edges corresponding to said sync signal leading edges, but differing from said sync signal leading edges by a predetermined phase amount $\phi$, each of said resultant signal leading edges resulting in an associated subsequent trailing edge effectively differing from the leading edge which resulted in said trailing edge by an amount $W$; said phase adjustment means including an adjustable variable delay means for receiving said sync signal leading edges and providing, in response thereto, a delay signal having periodic pulses with delayed signal edges corresponding to said sync signal leading edges, but occurring at a subsequent adjustable time D no earlier than said sync signal leading edges which result in said delayed signal edges; phase locked loop means (PLL) for receiving, as one input, said delay signal and providing an output signal with phase adjusted edges in response to a phase comparison of input signals provided to said PLL; means for receiving said output signal phase adjusted edges and providing said resultant signal leading edges in response thereto; and means effectively coupling said resultant signal to said PLL for effective phase comparison with said delay signal pulses to provide said output signal, wherein the improvement comprises, means for processing at least one of said sync, delay, output and resultant signals such that said PLL effectively phase compares said trailing edges associated with said resultant signal leading edges with said delay signal adjustably delayed leading edges, whereby said phase adjustment $\phi$ of said resultant signal leading edges with respect to said sync signal leading edges can be either negative or positive and is a function of the adjustable delay D and W.

In the above discussed phase adjustment circuit, preferably the coupling means includes the recited processing means, and a peak detector and voltage divider are present in the processing means to develop a DC bias signal related to the peaks of a signal provided in response to the resultant signal pulses. In addition, the processing means preferably includes a DC clamp circuit which effectively rebiases the signal peaks to provide a new signal that is provided as an input to a switching circuit. The switching circuit essentially compares this new signal to a threshold level and provides an output in response to the new signal with the output being coupled to the phase locked loop for phase comparison with the delay signal. Typically the clamp circuit includes circuitry such that the new signal will have approximately equal positive and negative peaks with respect to the threshold level of the switching means. In this manner, the amplitude of the signal peaks will not substantially affect the operation of the phase adjustment circuit.

In the preferred embodiment of the present invention the resultant signal pulses correspond to the horizontal scan drive pulses that are generated in response to the horizontal sync signal leading edges. These drive pulses are used to provide retrace (flyback) pulses indicative of the horizontal reset (retrace) cycle of the video electron beam. Basically, the present invention involves implementing a phase comparison between the trailing edge of the retrace pulse, which occurs during the latter stages of horizontal resetting the electron beam, and adjustably delayed edges of a delay signal, corresponding to but delayed with respect to the horizontal sync pulse leading edges. The phase comparison is provided by a phase comparator in the phase locked loop.

In scanning video display systems, utilization of the improved phase adjustment circuit of the present invention enables implementing both positive and negative phase adjustment of the occurrence of the retrace pulse leading edge with respect to the leading edge of the horizontal sync pulse. This enables adjusting the start of the horizontal retrace cycle with respect to the horizontal sync signal to accommodate video formats wherein the video occurs either prior to, simultaneously with or after the occurrence of the accompanying leading edge of the horizontal sync pulse. This desired result occurs due to the effective phase locking the leading edge of the sync pulse with the trailing edge of the retrace pulse.

The operation and advantages of the present invention are explained more fully in conjunction with the subsequent description of the preferred embodiments of the present invention.

BRIEF DESCRIPTION OF THE DRAWINGS

For a more complete understanding of the present invention, reference should be made to the drawings in which.

DESCRIPTION OF THE PREFERRED EMBODIMENTS

Figure 1:
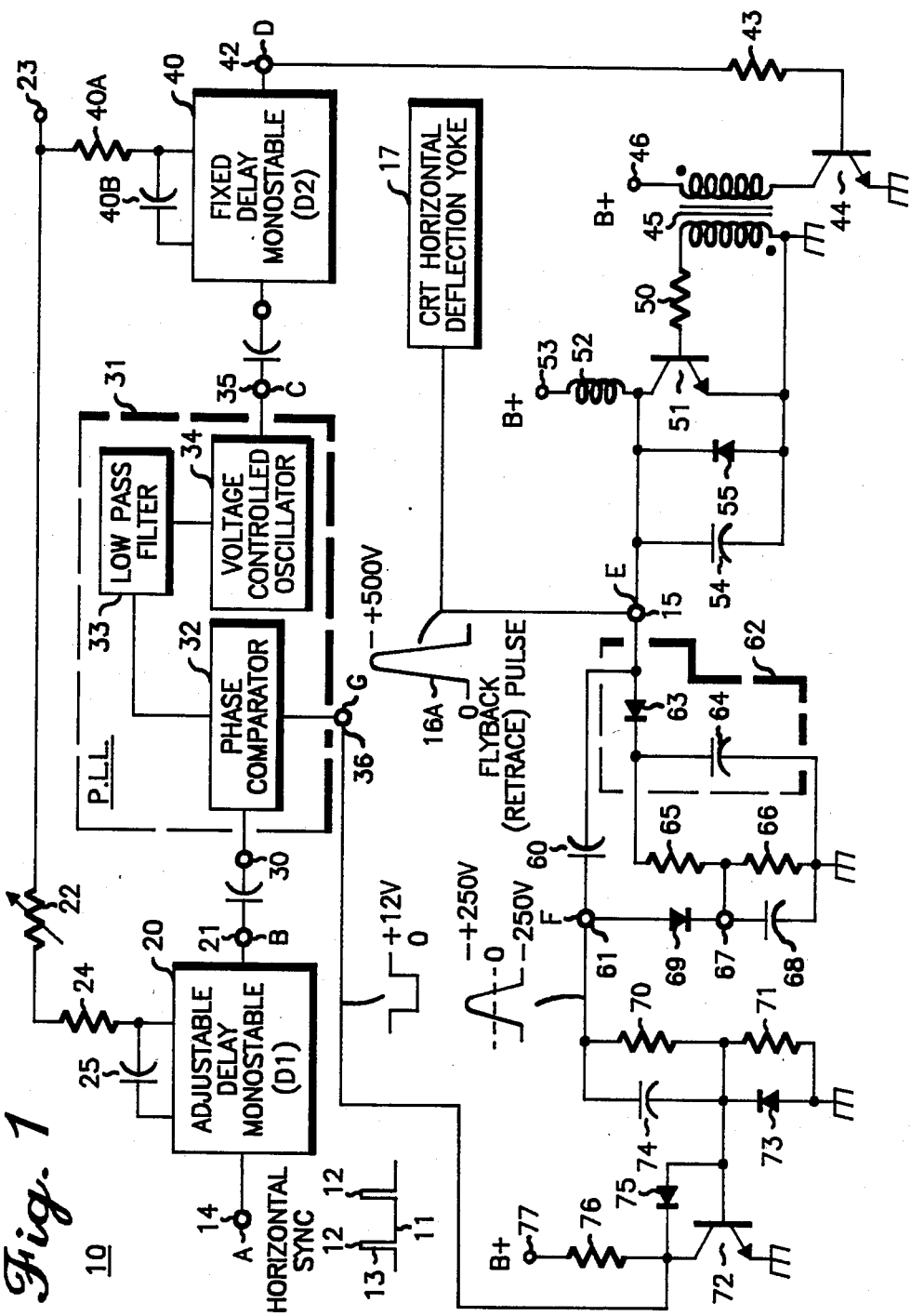
FIG. 1 comprises a schematic diagram of a scanning video display circuit having an improved phase adjustment circuit.

Referring to FIG. 1, a scanning video display circuit 10 is illustrated. The circuit 10 receives a horizontal sync signal 11 comprising a series of periodic pulses 12, each having an associated leading edge 13, at an input terminal 14. In response to the horizontal sync signal 11, the display circuit 10 provides, at an output terminal 15, a retrace signal 16 comprising a series of retrace (flyback) pulses 16A which effectively control the operation of a cathode ray tube (CRT) horizontal deflection yoke 17. The manner in which the retrace pulses 16A control the excitation current of the CRT horizontal deflection yoke 17 is well understood and conventional and does not form a significant part of the present invention which is concerned with providing a variable phase adjustment so as to adjust the occurrence of leading edges 16B of the retrace pulses 16A with respect to the occurrence of the leading edges 13 of the horizontal sync signal.

Figure 2:
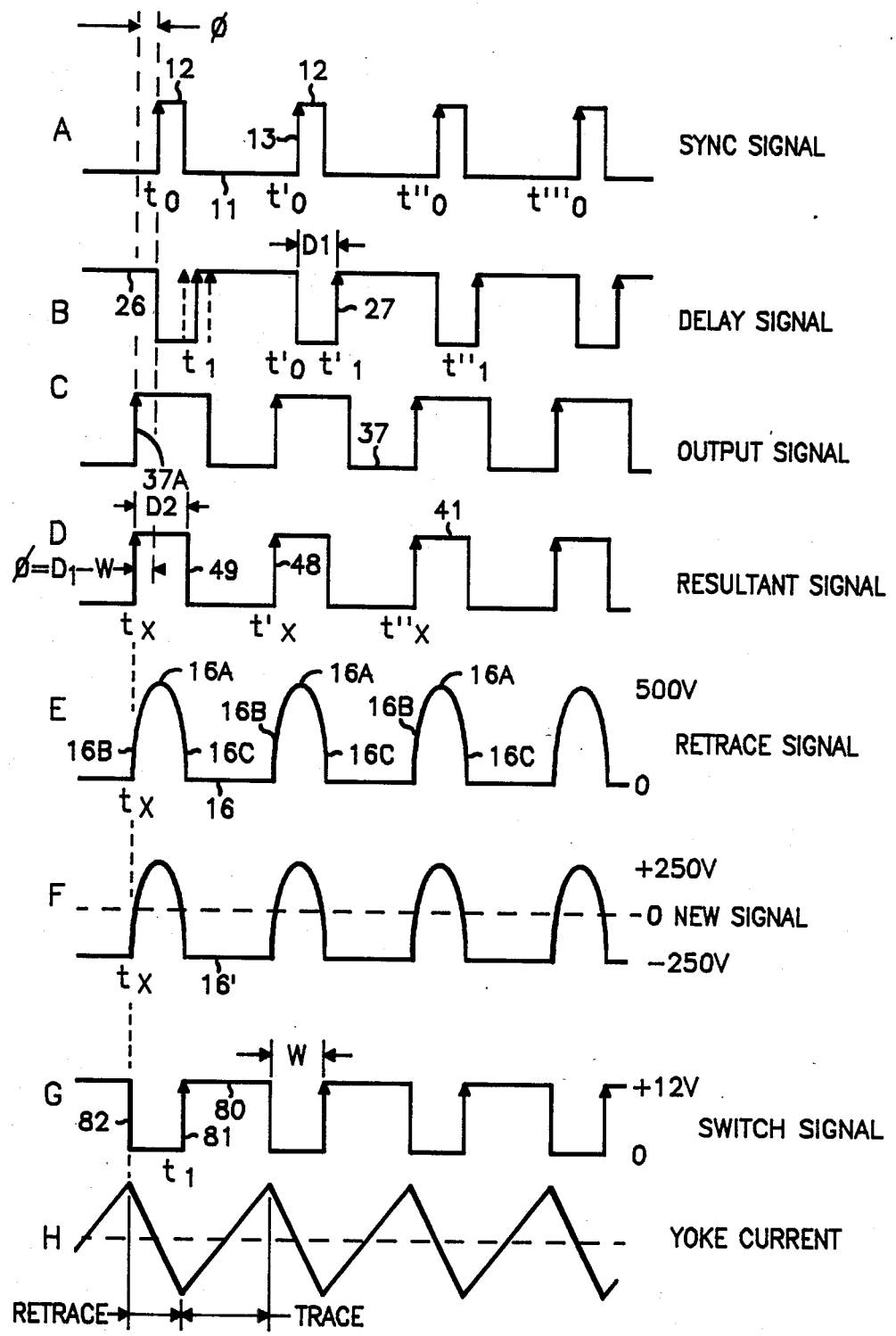
FIG. 2 comprises a series of graphs A-H illustrating waveforms for various signals provided by the video display circuit shown in FIG. 1.

It should be noted that the waveforms shown in FIG. 2 correspond to various signals provided by the circuit 10 in FIG. 1. All the waveforms in FIG. 2 have the same horizontal scale representing time. The vertical scale in FIG. 2 represents amplitude and this vertical scale is different for several of the waveforms shown in FIG. 2. The horizontal sync signal 11 is illustrated as waveform A in FIG. 2 wherein each of the leading edges 13 of the sync signal occurs at a reference time $t_O$, $t_O'$, $t_O''$ etc. The retrace pulses 16A are part of the retrace signal 16 which is illustrated as waveform E in FIG. 2. The leading edges 16B of the retrace pulses occur at times $t_x$, $t_x'$, etc.

A feature of the present invention is to provide a variable, manually adjustable, phase adjustment circuit such that the pulses 16A can be adjusted with respect to their time occurrence so that their leading edges 16B can occur either prior to, coincidence with or after the occurrence of the leading edges 13 of the horizontal sync signal 11. This flexibility is desirable since video signals which accompany the horizontal sync signal 11 may also commence either prior to, coincidence with or after the leading edges 13 of the sync signal. Therefore, in order to be able to adjust the horizontal scanning of an associated CRT (not shown in FIG. 1) such that the video picture will be properly horizontally centered on the CRT screen without any loss of any video, a phase adjustment circuit capable of implementing negative or positive phase adjustment must be provided. The present invention provides a manually adjustable phase adjustment circuit to accommodate any of the aforementioned video formats.

As shown in FIG. 1, the input or receiving terminal 14 for the horizontal sync signal is coupled as an input to a manually adjustable delay monostable circuit 20 which implements a manual adjustable delay D1 for output pulses provided at a terminal 21 in response to the occurrence of each of the leading edges 13 of the horizontal sync signal 11. This is provided by manually adjusting a variable resistor 22 connected between a power supply terminal 23 and a resistor 24 connected to the monostable 20. In addition, a capacitor 25 is also illustrated as coupled to the monostable circuit 20.

Essentially, the resistors 22 and 24 and the capacitor 25 determine the amount of adjustable delay provided by the monostable circuit 20. The signal provided at the monostable output terminal 21 comprises a delay signal 26 illustrated as waveform B in FIG. 2. In response to the occurrence of each leading edge 13 of the horizontal sync signal 11, triggering of the monostable circuit 20 occurs such that the output of the monostable is set low concurrently with the occurrence of the leading edge 13, and returns to a high state at a subsequent time $t_1$ wherein this time is manually adjustable by means of adjusting the resistance of the variable resistor 22. In essence, the monostable circuit 20 reacts to a positive going (rising) leading edge 13 at the time $t_0$ by delaying the occurrence of a similar positive going leading edge 27 at a subsequent time $t_1$ by a delay time $D_1$. This is illustrated in FIG. 2. It should be noted that the occurrence of each leading edge 13 will result in providing a subsequent corresponding leading edge 27 which occurs no earlier than the leading edge 13.

The monostable circuit 20 merely corresponds to conventional monostable circuits which are known to implement either adjustable or fixed delays in response to the occurrence of either rising or falling signal transitions such as the rising leading edge transition 13 of the horizontal sync signal 11. Since the construction of such monostable circuits is well known, details regarding the construction of the monostable circuit 20 will not be discussed herein. Essentially, the monostable circuit 20 provides the delay signal 26 that contains delayed leading edges 27 corresponding to but delayed with respect to the occurrence of the leading edges 13 of the horizontal sync signal. This effectively implements a predetermined delay $D_1$ between the occurrence of the leading edges 13 and the occurrence of the leading edges 27.

The delay signal 26 of the terminal 21 is capacitively coupled to an input terminal 30 of a phase locked loop (PLL) 31 illustrated in dashed outline form in FIG. 1. The PLL 31, as is well known to those skilled in the art, basically comprises a phase comparator 32, the output of which is connected by a low pass filter 33 as an input to the control input of a voltage controlled oscillator (VCO) 34, the output of which is provided at an output terminal 35. The delay signal 26 at the terminal 30 is provided as one input to the phase comparator 32 which also receives another input from a terminal 36 and provides an output signal 37 in response thereto at the terminal 35. The output signal 37 is illustrated as waveform C in FIG. 2 wherein the phase locked loop 31 essentially controls the output of the VCO 34 so as to minimize the difference between the two input signals received by the phase comparator 32. A feedback signal path is provided between the terminals 35 and 36 so that a condition of phase lock is maintained by the PLL between rising signal edges received at the terminals 30 and 36 by adjusting the output signal 37 provided at the terminal 35. This is understood as corresponding to the conventional operation of phase locked loops.

In the present embodiment the phase locked loop 31 insures that the proper time occurrence for the retrace pulses 16 will be implemented despite signal variations which may occur due to component temperature changes. In addition, the phase locked loop 31, or at least the VCO 34 to be more specific, provides a 50% duty cycle for the output signal 37 provided at the terminal 35. This signal 37 is capacitively coupled as an input to a fixed delay monostable circuit 40 which, in response to the output signal 37, provides a fixed delayed resultant signal 41 at a terminal 42. This resultant signal at the terminal 42 is illustrated as waveform D in FIG. 2 and is coupled through a resistor 43 to the base of an NPN transistor 44 having its emitter grounded and its collector connected to the primary winding of a transformer 45 with the primary winding connected to a B+ terminal 46. The monostable 40 implements a fixed delay D2 between rising edges 37A, at times $t_x$, of the output signal 37 and falling (trailing) edges 49 of the resultant signal 41. This occurs by virtue of a fixed resistor 40A and a capacitor 40B. The operation of the monostable 40 is substantially identical to that of the monostable 20 except that now a fixed delay is implemented rather than a manually adjustable delay.

Essentially, the monostable circuit 40 responds to the rising edges 37A of the output signal 37 by being set high, and then after a fixed delay period D2, the resultant signal 41 at the terminal 42, comprising the signal in FIG. 2, returns to a low state after delay D2. The low state of the signal 41 is retained until the next occurrence of a rising transition 37A of the signal 37. The main purpose of the monostable 40 is to transform the 50% duty cycle signal 37 into a 60/40% duty cycle signal 41 since the next stage to be driven prefers to see a 60/40 duty cycle drive signal.

The waveform D in FIG. 2 illustrates the desired adjustable phase difference $\phi$ which exists between the leading edge 13 of the sync signal 11 and the leading (rising) edge 48 of the resultant signal 41 wherein the leading edges 48 correspond to the beginning (leading edges 16B) of the retrace pulses 16A. The trailing edges 16C of the retrace pulses 16A do not necessarily correspond to the trailing edges 49, but more precisely correspond to associated, subsequent trailing edges which result from the resultant signal leading edges 48. The trailing edges 16C effectively differ from the leading edges 48 by an amount W corresponding to the pulse width of a switch signal 80 derived from signal 16. The actual width of the pulses 16A, the time between a leading edge 16B and a trailing edge 16C, is determined primarily by the inductance of yoke 17 and other circuit component values, and this explains why the trailing edges 49 and 16C do not necessarily coincide in time occurrence.

Basically, the present invention is concerned with providing a phase adjustment circuit such that a positive or negative value for the phase adjustment amount $\phi$ can be implemented such that the leading edges 48 of the resultant signal 41 can be adjusted to either precede, be coincidence with or follow the leading edge 13 of the horizontal sync signal 11. In the present case the leading edge 48 of the signal 41 initiates and is substantially coincident with the leading edge 16B of the retrace pulse 16 of a horizontal scan circuit thus permitting phase adjustment of a horizontal scan circuit so as to have this circuit provide desirable phase adjustment for any of a variety of video signal formats which may be received. This is accomplished in the following manner.

The primary winding of the transformer 45 is coupled to a secondary winding of this transformer which has one end connected to ground and another end coupled through a resistor 50 to the base of an NPN transistor 51 having its emitter connected to ground and its collector directly connected to the output terminal 15. The terminal 15 is connected through a choke 52 to a positive B+ terminal 53 at which a relatively high voltage is provided. In addition, the terminal 15 is connected to ground through the parallel combination of a capacitor 54 and damper diode 55. The components 50–55 and the horizontal deflection yoke 17 comprise a conventional drive system for a horizontal deflection yoke of a scanning video display system. The operation of such a horizontal drive system is as follows.

Basically, in response to periodically turning on the transistor 44, which occurs in response to and coincident with leading edges 48, the transistor 51 is turned off. The turning off of the transistor 51 results in providing very large magnitude (500 volts) flyback (retrace) pulses 16A at the terminal 15 due to the energy stored in the horizontal deflection yoke 17. This flyback pulse is representative of a change in direction of the deflection yoke current and indicates the commencement of resetting of the scanning electron beam to one edge of the CRT screen in response to a change in the deflection yoke excitation. This resetting is referred to as the retrace cycle. Subsequently the yoke current will start to increase and the transistor 51 is turned on. To best understand this, reference should be made to the waveform H in FIG. 2 which essentially illustrates the deflection yoke current and how it corresponds to the occurrence of the flyback (retrace) pulses 16A. The operation of horizontal deflection yoke drive circuitry so as to obtain the sawtooth waveform shown in waveform H in FIG. 2 is well known to those skilled in the art and therefore will not be discussed in any more detail. What should be noted is that the flyback pulses 16A exist during and therefore correspond to the retrace period of the horizontal deflection yoke current during which time no video information is typically provided. The object of the present invention is to assure the occurrence of this retrace period when no video information is present and to adjust the occurrence of this retrace period so as to desirably center the occurrence of video with respect to the trace cycles which occur between retrace cycles.

In the present embodiment adjusting the occurrence of the retrace cycle with respect to the sync signal is essentially accomplished by adjusting the phase difference of the resultant signal 41 with respect to the horizontal sync signal 11. In accomplishing this phase adjustment, the flyback pulses 16A are utilized to provide a feedback signal which will eventually result in the input signal at the terminal 36 which is provided to the phase comparator 32. The reason why the retrace pulses at the terminal 15 are utilized, instead of the resultant output signal 41 at the terminal 42, is that the retrace pulses 16A are more directly representative of the actual deflection yoke excitation since they include any temperature or other type of drift phenomena which may be attributable to the transformer 45 and drive transistors 44 and 51.

The retrace signal 16 at the terminal 15 is coupled through a capacitor 60 to a terminal 61. In addition, the retrace signal 16 is provided as an input to a peak detector circuit 62 comprising a diode 63 and a capacitor 64 connected in series between the terminal 15 and ground. A resistor divider comprising resistors 65 and 66 are connected across the capacitor 64 which provides a DC voltage representative of the peaks of the signal 16. The resistors 65 and 66 divide down the peak DC voltage by a predetermined factor and provide this divided peak DC bias signal at a terminal 67 connected to ground through a capacitor 68. A diode 69 has its anode connected to the terminal 61 and its cathode connected to the terminal 67. The diode 69 acts a clamping diode so as to insure that the peak of the signal at the terminal 61 (a new signal 16' related to the retrace signal 16) will not exceed, by more than a diode drop, the DC voltage maintained at the terminal 67. The magnitudes of the resistors 65 and 66 are about equal. This results in the new signal 16' at the terminal 61 essentially corresponding to the signal 16, which previously varied between ground and 500 volts, wherein the new signal at the terminal 61 now essentially varies between + and − 250 volts. Essentially the clamping diode 69 establishes ground as a reference bias level about which the new signal 16' at the terminal 61, derived from the retrace pulses 16A, will vary. The waveform for signal 16' is shown as waveform F in FIG. 2.

The terminal 61 is connected through a voltage divider comprising resistors 70 and 71 to the base of a NPN transistor 72 having its emitter connected to ground and its collector connected to the terminal 36. This effectively provides an input signal to the base of the transistor 72 comprising a small proportion of the new signal 16' at terminal 61. The resistors 70 and 71 have typical magnitudes of 100 K ohms and 3.3K ohms, respectively. A diode 73 is connected between ground and the base of the transistor 72 and prevents the transistor base voltage from going more negative than one diode drop below ground. The diode 73 is essentially a protection circuit to prevent the signal at the terminal 61 from damaging the transistor 72 by exceeding the reverse base emitter break down voltage of this transistor. This is accomplished by clamping the base voltage such that it cannot be more than one diode drop below ground. A capacitor 74 is provided between the terminal 61 and the base of the transistor 72 and is essentially provided for insuring that the transistor 72 will rapidly respond to transitions of the new signal at the terminal 61. A diode 75 is also utilized to speed-up the switching response of the transistor 72 and the collector of this transistor is connected through a resistor 76 to a B+ terminal 77.

Essentially, the flyback pulses 16A are processed by the peak detector circuit comprising the diode 63 and capacitor 64 and a DC voltage related to the peaks of this signal is divided down by the resistors 65 and 66 so as to provide a DC signal at terminal 67 equal to ½ of the peak value of the retrace pulses. This half peak value signal at the terminal 67 is then utilized, by the clamping diode 69, to assure that the new signal 16' at the terminal 61 will vary substantially symmetrically about a threshold level substantially corresponding to zero volts since the peak of the signal at the terminal 61 is now substantially ½ of the 0 to 500 volt pulses 16A provided at the terminal 15. The resistors 70 and 71 couple a portion of the new signal 16' at terminal 61 to the base of the transistor 72 which then effectively utilizes this divided down signal for comparison with a threshold level of 0.7 volts corresponding to the base-emitter turn-on voltage of the transistor 72. The magnitudes of the resistors 70 and 71 are selected such that the transistor 72 will be turned on and off substantially conincident with the leading and trailing effective edges (16B, 16C) of the retrace pulses 16A. The transistor 72 also provides a signal inverting function which is significant in the present case since this causes the phase comparator 32 to effectively phase lock the trailing edges 16C to the delayed edges 27.

The signal at the terminal 36 provided by the transistor 72 corresponds to the switch signal 80 shown as waveform G in FIG. 2. This signal 80, as well as signals 16 and 16' can also be generally considered as resultant signals since they are created in response to the output signal 37. It should be noted that the signal 80 generally corresponds to the retrace signal 16, but has an opposite polarity with rising edge transitions 81 generally corresponding to the trailing edges 16C of the retrace pulses 16A. It should also be noted that the signal 80 essentially comprises negative going pulses which have leading edges 82 that occur at the effective leading edges 16B of the retrace pulses 16A and have trailing (rising) edges 81 that occur at the trailing edges 16C of the pulses 16A. The leading edge of the pulses 16A coresponds to the leading edge 48 of the resultant signal 41. The negative going pulses of the signal 80 have a pulse width W as shown in FIG. 2, and this pulse width corresponds to the middle amplitude pulse width of the retrace pulses 16A shown in FIG. 2. This is because the threshold level comparison implemented by the transistor 72 effectively occurs at the middle of the peak amplitude of the retrace pulses 16A due to the operation of the peak detector and clamping circuits of the present invention. In actual practice the pulse width W may be 60% of the actual width between edges 16B and 16C due to measuring the width of pulses 16A at their mid amplitude level.

It is significant to note that the signal 80, which appears at the terminal 36 and is provided as one input to the phase comparator 32, has rising transitions 81 generally corresponding to the trailing edges 16C of the retrace pulses 16A. It should be noted that the trailing edges 16C are associated with, subsequent to and provided in response to the resultant signal leading edges 48, but differ therefrom generally by the pulse width W. The other input to the phase comparator 32 comprises the delay signal 26 which has rising transitions 27 which are manually adjustably delayed with respect to the leading edges 13 of the sync signal 11. The phase comparator 32 operates by comparing the rising edges 27 with the rising edges 81 and providing transitions in the output signal 37 so as to minimize any difference between these two rising edges. Thus due to the operation of the phase locked loop 31 and the feedback signal path between the terminals 35 and 36, the rising edges 27 and 81 will essentially be coincident at times $t_1$. This means that the beginning of the retrace pulses 16A, which essentially corresponds to the leading edges 48 of the resultant signal 41, will occur at a phase amount $\phi$ with respect to the leading edge 13 of the horizontal sync signal 11. This phase amount $\phi$ will be equal to the adjustable delay period $D_1$ minus the pulse width W of the retrace pulses 16. This means that (1) by reducing the delay period $D_1$ a negative phase angle can be achieved, (2) by selecting a delay period $D_1$ equal to the retrace pulse width W zero phase can be implemented, (3) and by providing a delay period $D_1$ in excess of the retrace pulse width a positive phase angle can be implemented. The delay period $D_1$ can be manually set by manually adjusting the magnitude of resistor 24.

In other words, the present invention, has enabled a negative through positive manual phase adjustment of the signals 16 and 41 with respect to the leading edge 13 of the horizontal sync signal 11. This is particularly beneficial when the present invention is utilized in a scanning video display system in which various video formats may be utilized in conjunction with received horizontal sync pulses. It should be noted that D1 and W are both less than the period of the sync signal 11, and therefore the present phase adjustment is stable and not very susceptible to phase jitter.

It should be noted that the present invention is particularly advantageous when very high horizontal sweep frequencies for the deflection yoke 17 are contemplated, such as horizontal sweep rates in the range of 50 KHz to 90 KHz. It should also be noted that typically the retrace pulse width time is in the range of 2.7 microseconds to 4.0 microseconds. Also, since the present invention implements an effective utilization of the retrace pulse width by measuring this pulse width at the average (mid-peak) value of the retrace pulses, noise immunity for the present invention with regard to determining the retrace pulse width is provided. In addition, the present invention minimizes the effects of variations in the peak of the retrace pulses as effecting the retrace pulse width W used for calculating the phase shift $\phi$. This is due to the present invention measuring the pulse width W at the average value of the retrace pulses. The pulse width W at this average value does not vary substantially, even when the peak values of the retrace pulses do vary substantially. Noise immunity is also provided since at the average value of the retrace pulse peaks the rate of rise and fall of the retrace pulses is extreme thus adding to the noise immunity of the present invention in calculating the pulse width W used for implementing the phase shift $\phi$.

While specific embodiments of the present invention have been shown and described, further modifications and improvements will occur to those skilled in the art. Such modifications could comprise utilizing similar structure for having the phase comparator 32 directly compare the trailing edges 49 of the resultant signal 41 with the delayed signal edges 27. This is not as desirable as the preferred embodiment since it ignores any phase drift due to the circuit components 40-54, when such components are present. In addition, the trailing edges 49 may not always precisely correspond in time occurrence to the trailing edges 16C so that accurate stable adjustment of the retrace pulses may not be achieved. However, all such modifications which retain the basic underlying principles disclosed and claimed herein are within the scope of the present invention.

I claim:

1. A phase adjustment circuit comprising:
   means for receiving a sync signal comprising periodic pulses having leading edges;
   phase adjustment means for receiving said sync signal leading edges and providing in response thereto a resultant signal comprising periodic pulses having effective leading edges, said resultant signal leading edges comprising controllable phase adjusted leading edges corresponding to said sync signal leading edges, but differing from said sync signal leading edges by a predetermined phase adjustment $\phi$, each of said resultant signal leading edges resulting in an associated subsequent trailing edge effectively differing from the leading edge which resulted in said trailing edge by an amount W;

said phase adjustment means including an adjustable variable delay means for receiving said sync signal leading edges and providing, in response thereto, a delay signal having periodic pulses with delayed signal edges corresponding to said sync signal leading edges, but occurring at a subsequent adjustable delay time D no earlier than said sync signal leading edges which result in said delayed signal edges;

phase locked loop means (PLL) for receiving, as one input, said delay signal and providing an output signal with phase adjusted edges in response to a phase comparison of input signals provided to said PLL;

means for receiving said output signal phase adjusted edges and providing said resultant signal leading edges in response thereto; and means effectively coupling said resultant signal to said PLL for effective phase comparison with said delay signal pulses to provide said output signal, wherein the improvement comprises, means for processing at least one of said sync, delay, output and resultant signals such that said PLL effectively phase compares said trailing edges associated with said resultant signal leading edges with said delay signal adjustably delayed leading edges, whereby said phase adjustment amount $\phi$ of said resultant signal leading edges with respect to said sync signal leading edges can be either negative or positive and is a function of the adjustable delay time D and W.

2. A phase adjustment circuit according to claim 1 wherein said processing means is included in said coupling means and includes a peak detector means and voltage divider means for developing a DC bias signal related to peaks of a signal provided in response to said resultant signal pulses, and wherein said processing means includes a DC clamp circuit means for effectively receiving said bias signal and said signal having peaks and providing a new signal varying in accordance with said signal having peaks, but varying about a DC level determined by said DC bias signal.

3. A phase adjustment circuit according to claim 2 wherein said coupling means includes a switching means that receives said new signal, effectively compares it to a predetermined threshold level and provides a switch signal in response thereto, said switch signal being coupled to said PLL for phase comparison with said delay signal.

4. A phase adjustment circuit according to claim 3 wherein said clamp circuit means includes means such that said new signal has approximately equal positive and negative peaks with respect to said switching means threshold level.

5. A phase adjustment circuit according to claim 1 wherein said PLL includes a phase comparator receiving said delay signal and receiving a signal related to said resultant signal for phase comparison and providing, in response thereto, a control input to a voltage controlled oscillator which provides said output signal as an output.

6. A phase adjustment circuit according to claim 1 wherein said variable delay means is manually adjustable to provide said delay time D.

7. A phase adjustment circuit according to claim 6 wherein said phase adjustment amount $\phi$ is a function of the difference between D and W.

8. A phase adjustment circuit according to claim 7 wherein said sync signal pulses have a period and wherein D and W are each less than the period of the sync signal pulses.

9. A phase adjustment circuit according to claim 6 wherein said delay means comprises a monostable multivibrator.

10. A phase adjustment circuit according to claim 9 wherein said resultant signal providing means includes a monostable multivibrator circuit which receives said output signal phase adjusted edges and provides said resultant signal in response thereto.

11. A scanning video display phase adjustment circuit comprising:

means for receiving a sync signal comprising periodic pulses having leading edges, the occurrence of which initiates a retrace-trace video scanning sequence;

phase adjustment means for receiving said sync signal leading edges and providing in response thereto a resultant signal comprising periodic pulses having effective leading edges, said resultant signal leading edges comprising controllable phase adjusted leading edges corresponding to said sync signal leading edges but differing from said sync signal leading edges by a predetermined phase adjustment amount $\phi$, each of said resultant signal leading edges resulting in an associated subsequent trailing edge effectively differing from the leading edge which resulted in said trailing edge by an amount W;

video scanning means for receiving said resultant signal pulses and implementing said video retrace-trace sequence in response thereto by providing a retrace signal comprising pulses having a leading edge, corresponding to said resultant signal leading edge, indicative of the start of a retrace period and a trailing edge, corresponding to said associated trailing edge, indicative of the end of said retrace period;

said phase adjustment means including an adjustable variable delay means for receiving said sync signal leading edges and providing, in response thereto, a delay signal having periodic pulses with delayed signal edges corresponding to said sync signal leading edges but occurring at a subsequent adjustable delay time D no earlier than said sync signal leading edges which result in said delayed signal edges;

phase locked loop means (PLL) for receiving, as one input, said delay signal and providing an output signal with phase adjusted edges in response to a phase comparison of input signals provided to said PLL;

means effectively coupling said retrace signal pulses to said PLL for effective phase comparison with said delay signal pulses to provide said output signal, wherein the improvement comprises, means for processing at least one of said sync, delayed, output, resultant and retrace signals such that said PLL effectively phase compares the trailing edges of said retrace signal pulses with said delay signal adjustably delayed edges, whereby negative and positive phase adjustment of said retrace signal leading edges with respect to said sync signal leading edges is possible, and wherein $\phi$ is a function of D and W.

12. A scanning video display phase adjustment circuit according to claim 11 wherein said processing means includes a peak detector means and voltage divider means for developing a DC bias signal related to peaks of said retrace signal pulses, and wherein said processing means includes a DC clamp circuit means for receiving said bias signal and retrace signal pulses and providing a new signal varying in accordance with said retrace signal pulses, but varying about a DC level determined by said DC bias level.

13. A scanning video display phase adjustment circuit according to claim 12 wherein said coupling means includes a switching means that receives said new signal, effectively compares it to a predetermined threshold level and provides a switch signal in response thereto, said switch signal being coupled to said PLL for phase comparison with said delay signal.

14. A scanning video display phase adjustment circuit according to claim 13 wherein said clamp circuit means includes means such that said new signal has approximately equal positive and negative peaks with respect to said switching means threshold level.

15. A scanning video display phase adjustment circuit according to claim 11 wherein said PLL includes a phase comparator receiving said delay signal and receiving a signal related to said retrace signal for phase comparison and providing, in response thereto, a control input to a voltage controlled oscillator which provides said output signal as an output.

16. A scanning video display phase adjustment circuit according to claim 11 wherein said variable delay means is manually adjustable to provide said delay time D.

17. A scanning video display phase adjustment circuit according to claim 16 wherein said phase adjustment amount $\phi$ is a function of the difference between D and W.

18. A scanning video display phase adjustment circuit according to claim 17 wherein said sync signal pulses have a period and wherein D and W are each less than the period of the sync signal pulses.

19. A scanning video display phase adjustment circuit according to claim 16 wherein said delay means comprises a monostable multivibrator.

20. A scanning video display phase adjustment circuit according to claim 19 wherein said resultant signal providing means includes a monostable multivibrator circuit which receives said output signal phase adjusted edges and provides said resultant signal in response thereto.

* * * * *